United States Patent [19]

Earp

[11] Patent Number: 5,086,659

[45] Date of Patent: Feb. 11, 1992

[54] UPSHIFT BRAKE

[75] Inventor: Leonard Earp, Radcliffe, England

[73] Assignee: Eaton Corporation, Cleveland, Ohio

[21] Appl. No.: 663,355

[22] Filed: Mar. 4, 1991

[30] Foreign Application Priority Data

Apr. 17, 1990 [GB] United Kingdom ............... 9008482

[51] Int. Cl.$^5$ .................. F16H 57/10; F16D 55/00; F16D 55/36
[52] U.S. Cl. .................... 74/411.5; 188/71.1; 188/71.5
[58] Field of Search ........... 74/411.5; 188/71.1, 188/71.5, 73.1; 192/85 AA

[56] References Cited

U.S. PATENT DOCUMENTS

| | | | |
|---|---|---|---|
| 2,089,733 | 8/1937 | Criley | 192/85 AA X |
| 2,348,025 | 5/1944 | Peets et al. | 188/73.1 X |
| 2,804,176 | 8/1957 | Trevaskis | 188/73.1 X |
| 3,895,693 | 7/1975 | Lucien et al. | 188/71.5 X |
| 4,317,512 | 3/1982 | Sato | 192/85 AA |

Primary Examiner—Leslie A. Braun
Assistant Examiner—David W. Laub
Attorney, Agent, or Firm—H. D. Gordon

[57] ABSTRACT

An improved upshift brake (130) for a mechanical transmission (10) is provided. The upshift brake is provided with an axially clamped stator (138) and piston/cylinder assembly (148) to minimize cyclical axial loading and stress on the cantilevered end walls (134 and 136) of the upshift brake housing (132).

5 Claims, 4 Drawing Sheets

UPSHIFT BRAKE

BACKGROUND OF THE INVENTION

1. Related Aoolications

This application claims priority under 35 USC 119 from GB 9008482.3 filed Apr. 17, 1990.

2. Field of the Invention

The present invention relates to upshift brakes for mechanical change gear transmissions.

3. Descriotion of the Prior Art

Mechanical change gear transmissions (i.e. utilizing positive jaw clutches to engage and disengage desired gear ratios) of the automatic, semi-automatic and manual types which utilize upshift brakes, also called "inertia brakes" and "input shaft brakes", to quickly retard the rotational speed of gearing and clutch members associated with the transmission input shaft to provide quicker synchronization during an upshift (as compared to relying on engine rotational speed decay) are well known in the prior art.

Examples of such prior art transmissions may be seen by reference to U.S. Pat. Nos. 4,873,637; 4,852,006; 4,676,115; 4,648,290; 4,614,126; 4,361,060 and 3,478,851, the disclosures of all of which are hereby incorporated by reference.

In manual transmissions, the upshift brake is typically operator actuated by a control switch, often a normally open switch closed upon full overtravel or bottoming of the manual clutch pedal, which selectively causes a retarding force to be applied directly to the input shaft or to gearing or shafts constantly drivingly engaged to the input shaft. Typically, the input shaft or upshift brake will include a gear constantly meshed with a transmission gear driven by the input shaft and a selectively engaged friction brake pack is provided to frictionally ground the upshift brake gear to the transmission housing. Typically, the friction brake pack is engaged/released by means of a hydraulic or pneumatic piston/cylinder assembly.

While the prior art upshift brakes are generally well received and commercially successful, they are not totally satisfactory as the upshift brake housings were subject to axial and/or torque loading which, due to the cyclical loading, required excessively costly and/or weighty robust housing designs and/or could result in housing or brake assembly fatigue and/or failure.

SUMMARY OF THE INVENTION

In accordance with the present invention, the drawbacks of the prior art have been minimized or overcome by the provision of an upshift brake structure which reduces cyclical axial and/or torque loading on the upshift brake housing. This allows a smaller, more easily and universally fitted brake assembly housing to be used and/or allows the housing to be cast from an aluminum alloy for reduced weight.

The above is accomplished by providing an upshift brake wherein the stator member (carrying the fixed friction discs) and the actuating piston/cylinder assembly are axially clamped by a through bolt, independent of the housing, to minimize or isolate the housing end walls from cyclical axial loading. Further, the stator member is tightly clamped to the housing whereby torque is transferred primarily by a frictional coupling rather than by cooperating flat surfaces machined on the housing and stator member which, due to required manufacturing tolerances, can result in end loading with resultant high stress.

Accordingly, an object of the present invention is to provide a new and improved upshift brake structure which reduces or minimizes cyclical axial and/or torsional loading on the upshift brake housing.

This and other objects and advantages of the present invention will become apparent from a reading of the description of the preferred embodiment taken in connection with the attached drawings.

DESCRIPTION OF THE PREFERRED EMBODIMENT

Figure 4:
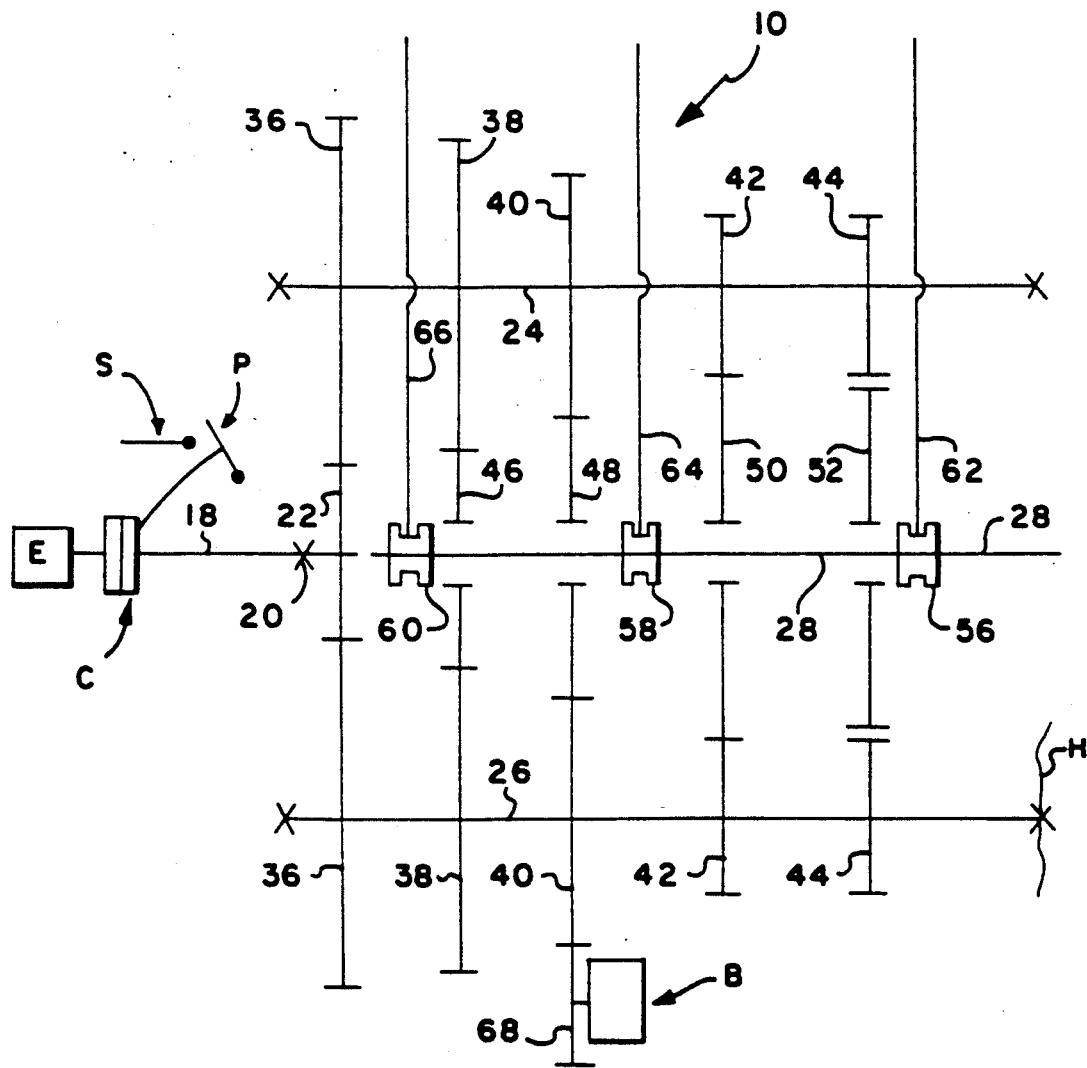
FIG. 4 is a schematic illustration of a mechanical transmission system utilizing an upshift brake.

Certain terminology will be used in the following description for convenience and reference only and will not be limiting. The words "upwardly", "downwardly", "rightwardly" and "leftwardly" will designate directions in the drawings to which reference is made. The words "forward" and "rearward" will refer respectively to the front and rear end of the transmission as same is conventionally mounted in a vehicle, being respectfully the left and right sides of the transmission as illustrated in FIG. 4. The words "inwardly" and "outwardly" will refer to directions toward and away from, respectfully, geometric center of the device and/or designated part thereof. Said terminology will refer to the words above specifically mentioned, and to the derivatives thereof and words of similar import.

Referring to FIG. 4, a simple mechanical transmission 10 of the type utilizing an input shaft brake B is schematically illustrated. While transmission 10 is a nonsynchronized simple transmission, it is understood that upshift brakes are also advantageously utilized with compound transmissions, synchronized transmissions and/or blocked transmissions. Examples of such transmissions may be seen by reference to U.S. Pat. Nos. 4,635,109; 4,754,665; 4,432,251 and/or 3,105,395, the disclosures of all of which are hereby incorporated by reference.

Transmission 10 includes an input shaft 18 supported adjacent its forward end by a bearing 20 and provided with an input gear 22 nonrotatably connected thereto, as by splines. The input gear 22 simultaneously drives a plurality of main section countershafts at equal sPeeds. In the illustrated embodiment, the transmission is provided with two main section countershafts, 24 and 26, disposed on diametrically opposite sides of the main shaft 28, which main shaft also defines the output shaft and is coaxially aligned with the input shaft 18.

The input shaft 18 is normally driven in one direction only by a prime mover, such as a throttle controlled diesel engine E through a selectively operated, normally engaged, friction master clutch C. Clutch C may be selectively disengaged by use of a pedal P as is known in the prior art. Preferably, as will be described in greater detail below, full depression or overtravel of clutch pedal P will operate a switch S for control of an input shaft brake B.

Each of the main section countershafts, 24 and 26, is provided with an identical grouping of countershaft gears, 36, 38, 40, 42 and 44 thereon. Which groupings form pairs of gears such as a pair of gears 36, of identical size and number of teeth and disposed on diametrically opposite sides of the main shaft 28. A plurality of main shaft drive gears 46, 48, 50 and 52 surround the main shaft 28 and are selectively clutchable thereto, one at a time, by sliding clutch collars as is well known in the art.

The main shaft gears 46, 48 and 50 encircle the main shaft 28 and are in continuous meshing engagement with, and are floatingly supported by, the diametrically opposed pairs of countershaft gears 38, 40 and 42, respectively, which mounting means and the special advantages resulting therefrom are explained in greater detail in U.S. Pat. Nos. 3,105,395 and 3,335,616, both assigned to the assignee of this invention and both hereby incorporated by reference.

The main shaft gear 52 is the reverse gear and is in continuous meshing engagement with a pair of countershaft gears 44 by means of conventional intermediate idler gears (not shown). The forward most countershaft gears 36 are continuously meshed with and driven by the input gear 22 for causing simultaneous rotation of the countershafts 24 and 26 whatever input shaft is rotatably driven.

The main shaft gears 46, 48, 50 and 52, and main section countershaft gears 36, 38, 40, 42 and 44, and the idler gears, are all constantly meshed with and driven by the input gear 22 and thus, in combination, form the input gearing of transmission 10.

Sliding clutch collars 56, 58 and 60 are splined to main shaft 28 for axial movement relative thereto and rotation therewith as is well known in the art. Sliding clutch 56 is axially slidable by means of shift fork 62 to clutch gear 52 to the main shaft. Sliding clutch 58 is axially slidable by means of shift fork 64 to clutch idler gear 50 or 48 to the main shaft. Sliding clutch 60 is axially slidable by means of shift fork 60 to clutch gear 46 to the main shaft or to clutch the input gear 22 (and thus the input shaft 18) to the main shaft. Shift fork 62, 64 and 66 are attached to shift bars, or shift rails, (not shown) as is well known in the prior art.

By way of example in an upshift of transmission 10 from third gear (gear 46 clutched to main shaft 28) to fourth gear (input gear 22 clutched to main shaft 28) it is necessary to disengage gear 46 from the main shaft 28 and then, as the rotational speed of main shaft 28 will remain substantially fixed during the shift transient, it is necessary to decrease the speed of input gear 22. As it may be undesirable to rely on the natural decay of the engine to slow the input shaft 18 and input gear 22, it is often desirable to utilize the input brake 8 for more rapid upshifts, as is well known in the prior art. Typically, to actuate the upshift brake B, the master clutch pedal P is fully depressed until a switch S is contacted which will actuate the input shaft brake B for additional, more rapid retardation of the transmission input gearing. In the embodiment illustrated, countershaft gear 40 on countershaft 26 is constantly meshed with an input shaft brake gear 68 which may be selectively frictionally grounded by means of the input shaft brake B for more rapid retardation of the input gearing of transmission 10 for quicker upshift synchronization.

Figure 3:
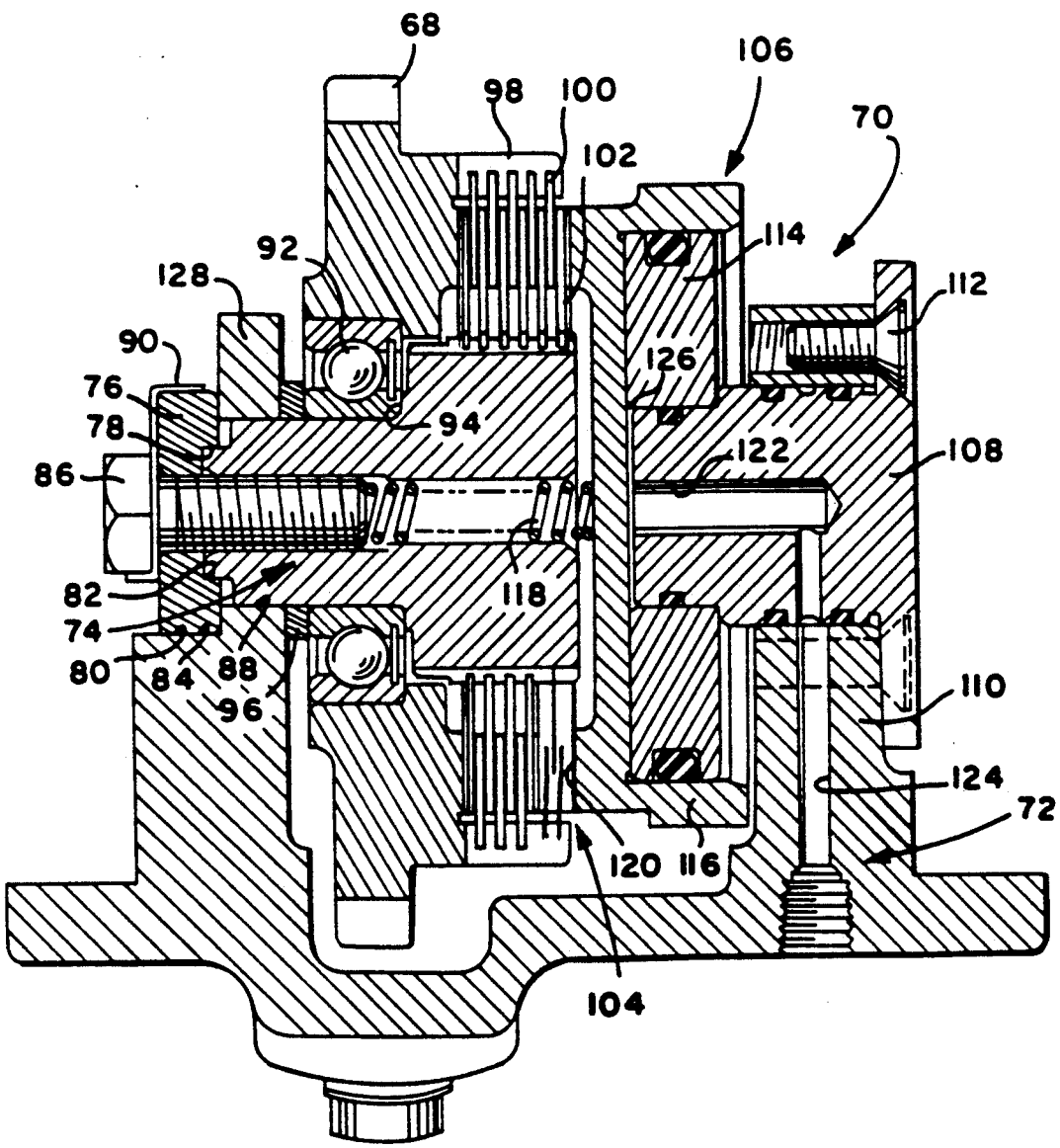
FIG. 3 is a plan view of a typical prior art upshift brake.

A typical prior art upshift brake 70 is illustrated in FIG. 3. The upshift or input shaft brake 70 includes a support housing 72 which is mountable to the housing of transmission 10. A stator member 74 is rotationally fixed to the housing 72 by means of a keeper member 76 having machined surfaces 78 and 80 which interact with complimentary flat surfaces 82 and 84 provided on the stator member and on the housing, respectively. A bolt 86 is provided for axially retaining the stator member and the keeper member in the bore 88 of the housing 72. A tab washer 90 interacts with the head of bolt 86 to rotationally fix the bolt relative to the stator and the housing.

The upshift brake gear 68 is rotatably supported on the stator by means of ball bearings 92 which are axially positioned between the shoulder 94 defined by the stator and the spacer 96 interposed the bearings and the inner surface of the lefthand in wall of housing 72. The input shaft gear 68 includes an inwardly extending annular sleeve 98 a plurality of carrying radially inwardly extending friction discs 100 which are interdigitated with radially outwardly extending brake discs 102 carried by the stator 94 to define a selectively engageable clutch disc pack 104.

A pressurized fluid piston/cylinder assembly 106 is provided for selective engagement and disengagement of the friction brake disc pack 104. The piston/cylinder assembly 106 includes a central supPort member 108 axially fixed to the righthand end wall 110 of the housing 72 by means of threaded fasteners 112, an axially fixed piston member 114 supported by the annular member 108 and an axially movable cylinder member 116 slidingly supported on a fixed piston member 114. The cylinder member 116 is biased axially rightwardly by means of a return spring 118 and includes engagement surfaces 120 for applying an axial compressor force to brake disc pack 104. The support member 108 defines a fluid passage 122 for cooperation with a fluid passage 24 defined in the housing 72.

Briefly, as is known, the upshift or input shaft brake 70 is normally disengaged as the return spring 118 biases the cylinder member 116 axially rightwardly. To engage the brake 70 pressurized fluid is introduced via passages 122 and 124 to chamber 126 which will cause the cylinder member 116 to move axially leftwardlY to engage the brake disc pack 104 thereby applying a retarding frictional drag to gear 68 and the input gearing of transmission 10. As may be seen, upon pressurization of chamber 126, an axial separation force will be applied to righthand end wall 110 and lefthand end wall 128 of the upshift brake housing 72 which axial loading, due to the cyclical loading, will require an excessively costly and/or weighty robust housing design and/or can resolve in housing fatigue and/or failure. Additionally, upon actuation of the input brake 70, a torque force will be applied to the stator member 74 by means of the brake discs 102 which torque will be reacted by the machined flat surfaces 78, 80, 82 and 84 to the housing 72. Due to the manufacturing tolerances and clearances between the machine flat surfaces, end loading can occur which will result in high stress to the cooperating flat surfaces.

Figure 1:
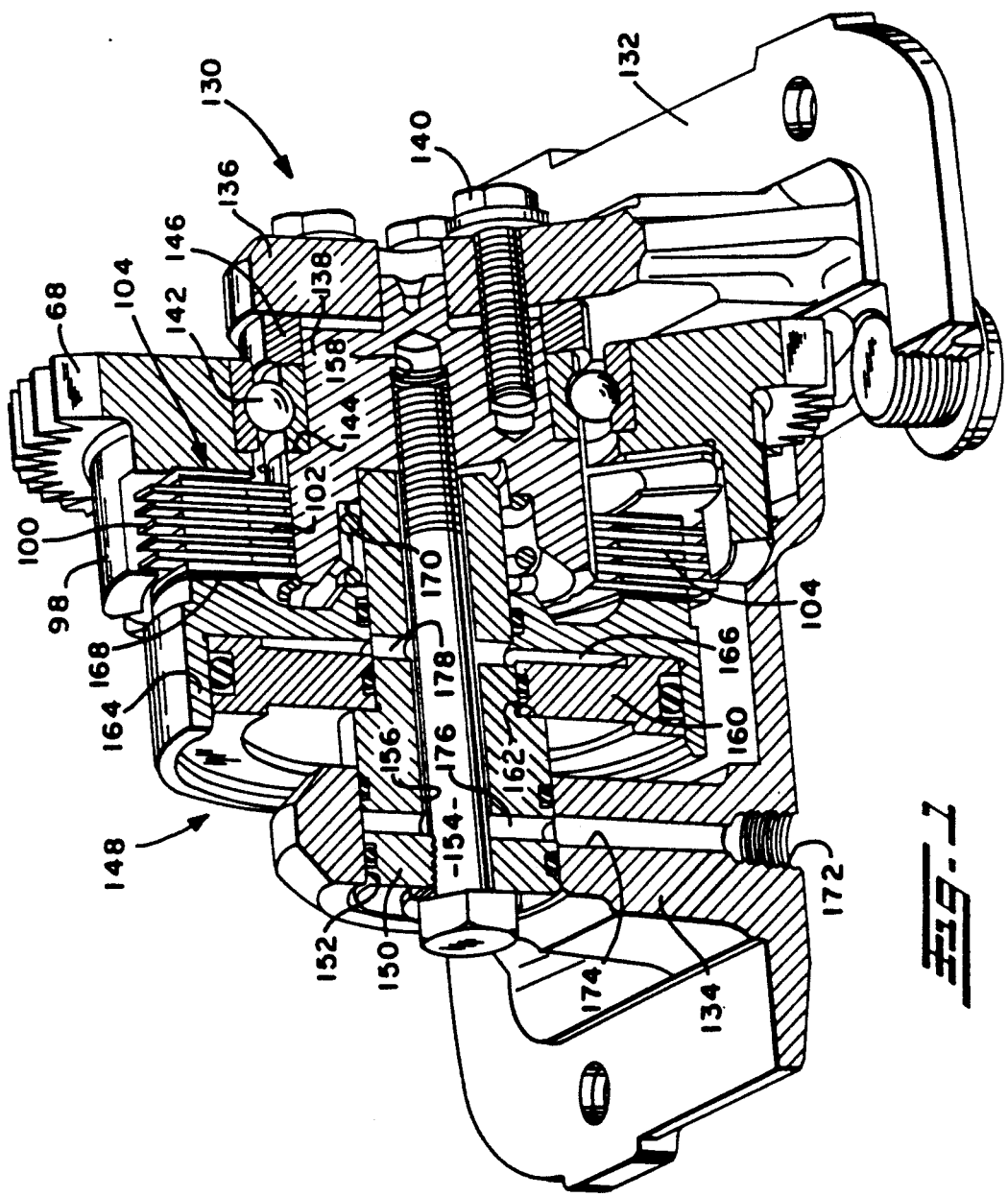
FIG. 1 is a perspective view, partially in section, of the upshift brake of the present invention.
Figure 2:
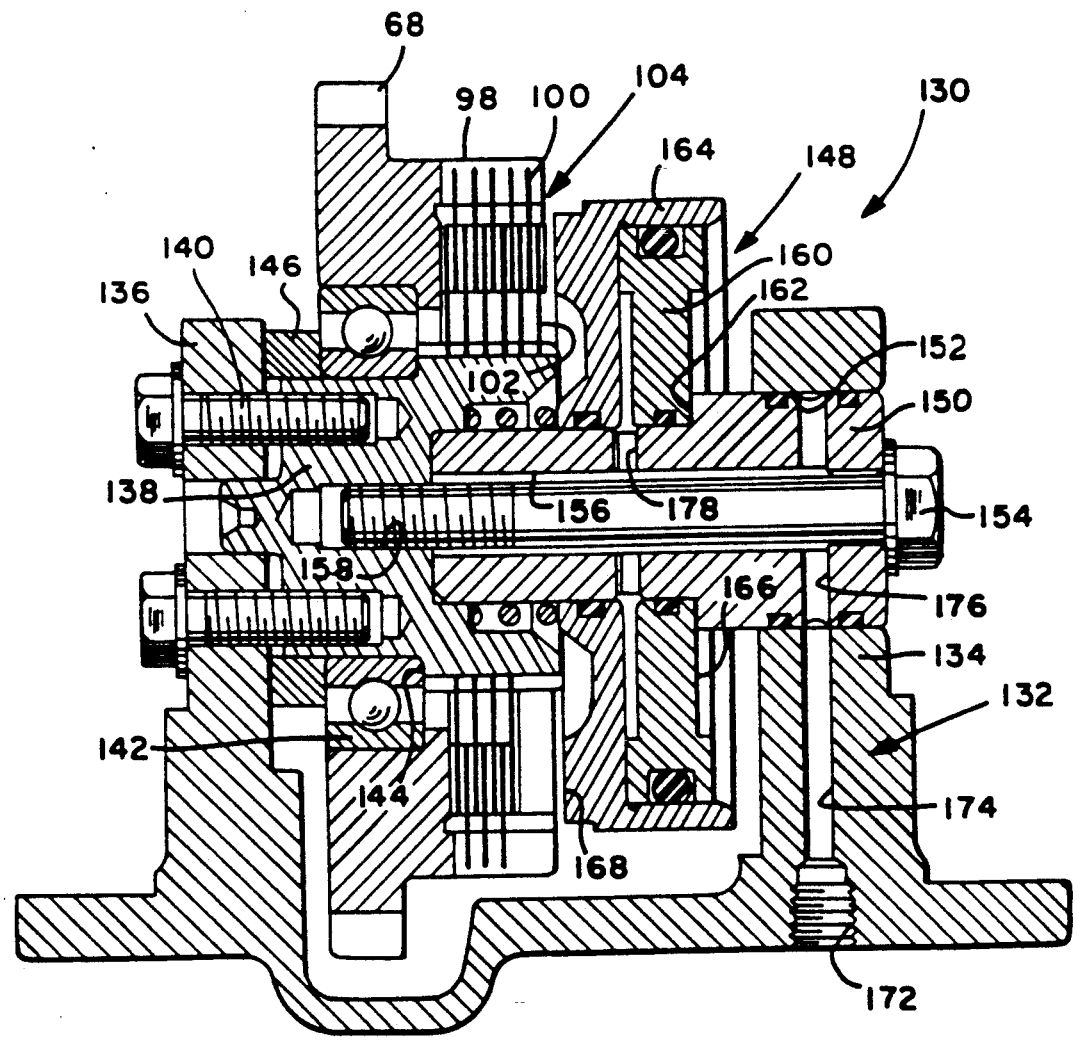
FIG. 2 is a plan view of the upshift brake as the present invention.

The improved upshift or input shaft brake 130 of the present invention may be seen by reference to FIGS. 1 and 2. As with the prior art upshift brake 70 described above, the upshift brake 130 of the present invention includes an upshift brake gear 68 which is constantly meshed with the input gearing of transmission 10 and includes a housing 132 mountable to the transmission housing of transmission 10.

The upshift brake housing 132 defines a cantilevered righthand end wall 134 and a cantilevered lefthand end wall 136. A stator member 138 is axially and rotationally fixed to the lefthand end wall 136 of the housing by means of a plurality of through bolts 140. The upshift brake gear 68 is rotationally supported on an outer diameter surface of stator 138 by means of a bearing such as roller bearing 142 which is axially positioned between a shoulder 144 defined by the stator 138 and a spacer member 146 interposed the lefthand end wall 136 of housing 132 and the bearing 142. The upshift brake gear 68 includes an inwardly extending annular sleeve 98 carrying a plurality of radially inwardly extending friction discs 100 which are interdigitated with radially outwardly extending brake discs 102 carried by the stator 138 to define a selectively engageable brake or brake disc pack 104.

A pressurized fluid actuated piston/cylinder assembly 148 is provided for selective engagement and disengagement of the brake disc pack 104. A central support member 150 is received within an enlarged through bore 152 provided in the rightward end wall 134 of housing 132 and is held in axial abutment with an axially inwardly facing surface of stator member 138 by means of a bolt member 154 which extends through an axial through bore 156 provided in central support member 150 and into a threaded bore 158 in the stator member. An axially fixed piston member 160 is supported on a reduced diameter portion of the central support member and is axially retained by means of shoulder 162 defined by the central support member 150. An axially movable cylinder member 164 is supported by both the central support member 150 and the axially fixed piston member 160 and, in combination with the piston and support member defines a selectively pressurized and exhausted actuation cavity 166. Cylinder member 164 includes abutment surfaces 168 for engagement with an axial compression of the brake disc pack 104 upon selective pressurization of chamber 166. A return spring 170 is provided for biasing the cylinder 164 axially rightwardly out of engagement of the clutch disc pack 104.

The housing end wall 134 is provided with a fitting 172 for connection to a source of pressurized fluid and defines a passage 174 which will communicate with a passage 176 provided in the inner support member 150 which communicates with the enlarged inner diameter bore 156 which bore communicates with another radially extending passage 178 which is in fluent communication with the selectively pressurized chamber 166. It is noted that the inner diameter of bore 156 and support member 150 is greater than the outer diameter of bolt 154 and thus Provides for fluid communication between the radially extending passages 176 and 178 in the support member 150, even when the bolt 154 is received with in the bore 156.

By axially clamping the central support member 150 to the stator member 138 by means of through bolt 154, the axial separation force is substantially absorbed by the through bolt to isolate the cantilever supporting end walls of housing 134 from bending stresses. Further, the four self-locking screws 140 utilized to clamp the stator member 138 to the housing 132 are designed to prevent rotational movement of the stator shaft relative to the housing primarily by the friction developed between the stator shaft assembly and the end wall 136. Since friction alone entirely resists relative rotational movement between the stator member assembly and the support end wall, the screws are relatively statically loaded and not subject to fatigue failure.

Accordingly, it may be seen, that an improved upshift brake structure has been provided which minimizes the axial and torque loading on the generally cantilever end walls of the brake housing and thus allows the use of a relatively smaller and less robust housing structure.

Although the present invention has been described with a certain degree of particularity, it is understood that the preferred embodiment has been described by way of example only and that various modifications and rearrangement of the parts are possible without departing from the spirit and the scope of the invention as hereinafter claimed.

I claim:

1. An upshift brake (130) for a mechanical change gear transmission (10) having input gearing (18, 22, 36, 38, 40, 42 and 44) and a housing (H), said upshift brake comprising a brake housing (132) defining a pair of generally parallel axially spaced end walls (134, 136) cantilever mounted to and extending from a base portion, a gear member (68) rotatably supported by one of said end walls and constantly meshed with one of the gears of the input gearing of said transmission, a stator member (138) rotationally and axially fixed to one of said end walls, said stator member axially fixed to and rotationally supporting said gear member, a friction brake disc pack (104) comprising at least one first disc (100) fixed to said gear and one second disc member (102) rotationally fixed tos aid stator, and a fluid cylinder/piston assembly (148) having a first axially contracted position corresponding to disengagement of said brake and a second axially expanded position corresponding to engagement of said brake, said piston/cylinder assembly including a reaction member (160) axially fixed relative to said brake housing, said upshift brake characterized by:

said cylinder/piston assembly additionally comprises a support member (150) axially movable relative to said housing and axially fixed relative to said reaction member, said support member being generally coaxial with said stator member, and means (154) for axially clamping said stator member to said axially fixed reaction member.

2. The upshift brake of claim 1 wherein said means comprises a through bolt (154) clamping said support member to said stator member.

3. The upshift brake assembly of claim 1 wherein said stator is axially preloaded into frictional abutment with said end wall.

4. The upshift brake of claim 3 wherein a plurality of self-locking screws are provided for axially preloading said stator into frictional abutment with said end wall.

5. The upshift brake of claim 1 wherein said support member comprises an annular portion supported in a bore (152) through the other of said end walls for axial and rotational movement relative thereto.

* * * * *